(12) United States Patent
Jasper et al.

(10) Patent No.: US 6,334,744 B1
(45) Date of Patent: Jan. 1, 2002

(54) CIRCLE CUTTING JIG

(75) Inventors: Leslie L. Jasper, Houston; William M. Jasper, Katy, both of TX (US)

(73) Assignee: Jasper Audio, Houston, TX (US)

( * ) Notice: Subject to any disclaimer, the term of this patent is extended or adjusted under 35 U.S.C. 154(b) by 0 days.

(21) Appl. No.: 09/320,782

(22) Filed: May 27, 1999

Related U.S. Application Data

(60) Provisional application No. 60/086,980, filed on May 28, 1998.

(51) Int. Cl.$^7$ .................................................. B23C 3/00
(52) U.S. Cl. ...................... 409/132; 33/270.03; 144/137; 144/154.5; 144/371; 409/179
(58) Field of Search ................................. 409/131, 132, 409/178, 179, 182; 33/21.1, 21.2, 27.01, 19.3, 27.04, 27.06; 144/371, 137, 154.5, 136.95

(56) References Cited

U.S. PATENT DOCUMENTS

| | | | | |
|---|---|---|---|---|
| 2,693,134 A | * | 11/1954 | Mole | ........................... 409/179 |
| 4,294,297 A | * | 10/1981 | Kieffer | ........................ 33/27.1 |
| 4,323,100 A | * | 4/1982 | Silken | ........................ 409/182 |
| 4,353,166 A | * | 10/1982 | Kettlestrings | ............... 33/27 C |
| 5,384,964 A | * | 1/1995 | McKay | ....................... 33/27.03 |
| 5,822,871 A | * | 10/1998 | Walker | ....................... 33/27.03 |

\* cited by examiner

Primary Examiner—William Briggs
(74) Attorney, Agent, or Firm—Williams, Morgan & Amerson

(57) ABSTRACT

A jig for use in conjunction with a router to cut circular openings is disclosed herein. The circular jig is comprised of a plate that has an escape hole for receiving a bit of the router therethrough, and a plurality of pivot holes formed therein. The plate has a reference point, and the pivot holes are arranged on the plate in a nonlinear array at preselected locations with respect to the reference point. A pivot pin inserted into the proper pivot hole allows the jig and router to be pivoted around the pivot pin and cut a circle of a preselected size.

37 Claims, 7 Drawing Sheets

US 6,334,744 B1

CIRCLE CUTTING JIG

In accordance with 35 U.S.C. 119(e), this application claims the benefit of U.S. Provisional Application No. 60/086,980, filed May 28, 1998.

BACKGROUND OF THE INVENTION

1. Field of the Invention

This invention relates generally to circle cutting devices, and, more particularly to a circle cutting jig that mounts to the base of a router.

2. Description of the Related Art

A router is a power tool that may be used in a variety of construction, industrial, or household applications. Generally, a router is comprised of a vertical motor that is mounted on a supporting frame. The motor may include a shaft that extends in a vertical direction away from the motor. Moreover, the shaft may include a chuck located on the furthest end of the shaft. The chuck may be adapted to simplify exchanging and securing a variety of bits. These bits may be used to determine the nature of the operation the router is to perform. For example, in one application, the router may be used to make cuts in wood, and by securing the appropriate bit in the chuck, the router may be manipulated to make precise cuts in the wood material.

A plunge router may be used to make circle cuts in a variety of materials. Typically, the plunge router is supported above the material to be cut using a spring mechanism that is attached to the support frame, and by applying a downward vertical force to the router, the attached bit may be engaged with the material to be cut. Those skilled in the art will appreciate that the vertical downward movement of the plunge router may be variably controlled, and the depth of the cuts made to the work piece may be precisely determined.

The plunge router may be used to construct mortises and circular cutouts in a variety of materials. For example, the plunge router may be used to form circular tabletops, to fabricate speaker cutouts, and to make arcs or circular patterns on furniture. Those skilled in the art will appreciate that a variety of devices are available to simplify making circular cuts using the plunge router. Unfortunately, these devices are costly and difficult to use. Moreover, because of different router configurations, a device or attachment that is designed for one router may not operate properly when used with a different router. The problem may be exacerbated by the large variety of routers that are available. Furthermore, the existing devices or attachments are not adapted for working with small circles. For example, it may be necessary to make circular cuts that have a diameter that is smaller than the diameter of the supporting frame of the router. In addition, it is desirable to have the ability to make circular cuts in incremental amounts with a high degree of resolution.

The present invention is directed to overcoming, or at least reducing the effects of, one or more of the problems set forth above.

SUMMARY OF THE INVENTION

In one aspect of the present invention, a circle jig is comprised of a plate that has an escape hole and a plurality of pivot holes formed therein. The plate has a reference point, and the pivot holes are arranged on the plate in a nonlinear array at preselected locations with respect to the reference point.

In another aspect of the present invention, a method for using a circle jig is provided. The method includes attaching the circle jig to a base of a router, and determining the diameter of a circular cut. A pivot hole on the circle jig that corresponds with the diameter of the circular cut is selected. The pivot holes are positioned in a nonlinear array at precise distances from a reference point of the circle jig. The pivot hole is secured about a pivot point in a work piece, and the circle jig and the router are rotated in a circular motion around the pivot point.

BRIEF DESCRIPTION OF THE DRAWINGS

The invention may be understood by reference to the following description taken in conjunction with the accompanying drawings, in which like reference numerals identify like elements, and in which.

Figure 1:
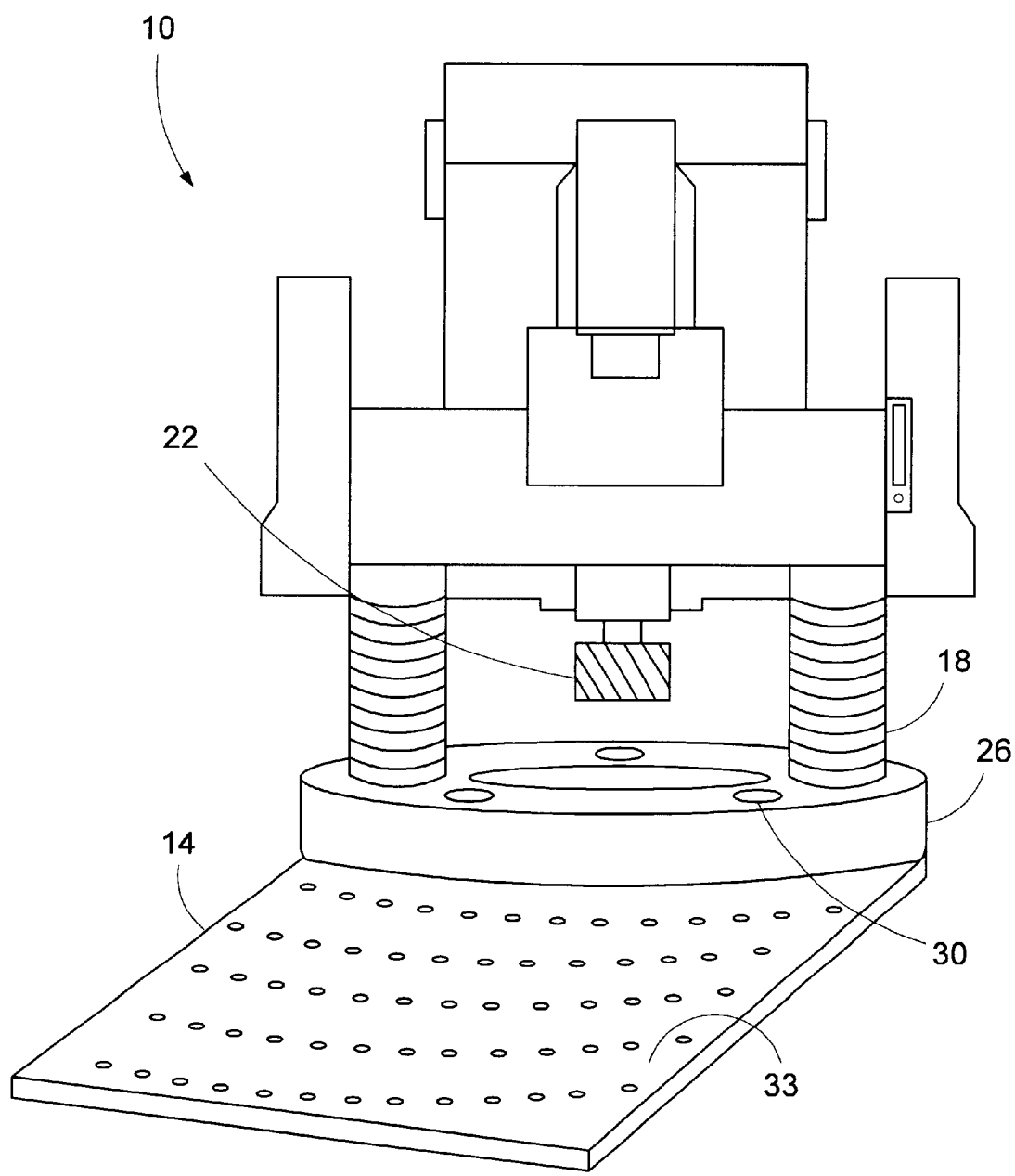
FIG. 1 illustrates a router having a circle jig attached thereto in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring to FIG. 1, a router 10 is shown attached to a circle jig 14, in accordance with one embodiment of the present invention. It is contemplated that the router 10 may be comprised of a variety of cutting devices. For example, in one embodiment, the router 10 is a plunge router that may be selectively engaged with a work piece (illustrated below.) The router 10 may include a support frame 18, a cutting bit 22, and a base 26. It is contemplated that a variety of methods may be used to mount the circle jig 14 to the base 26 of the router 10. For example, fasteners (not shown), such as bolts, screws, clips, etc., may be inserted through openings in the circle jig 14 and secured to the base 26 of the router 10 through a plurality of base holes 30.

Figure 2:
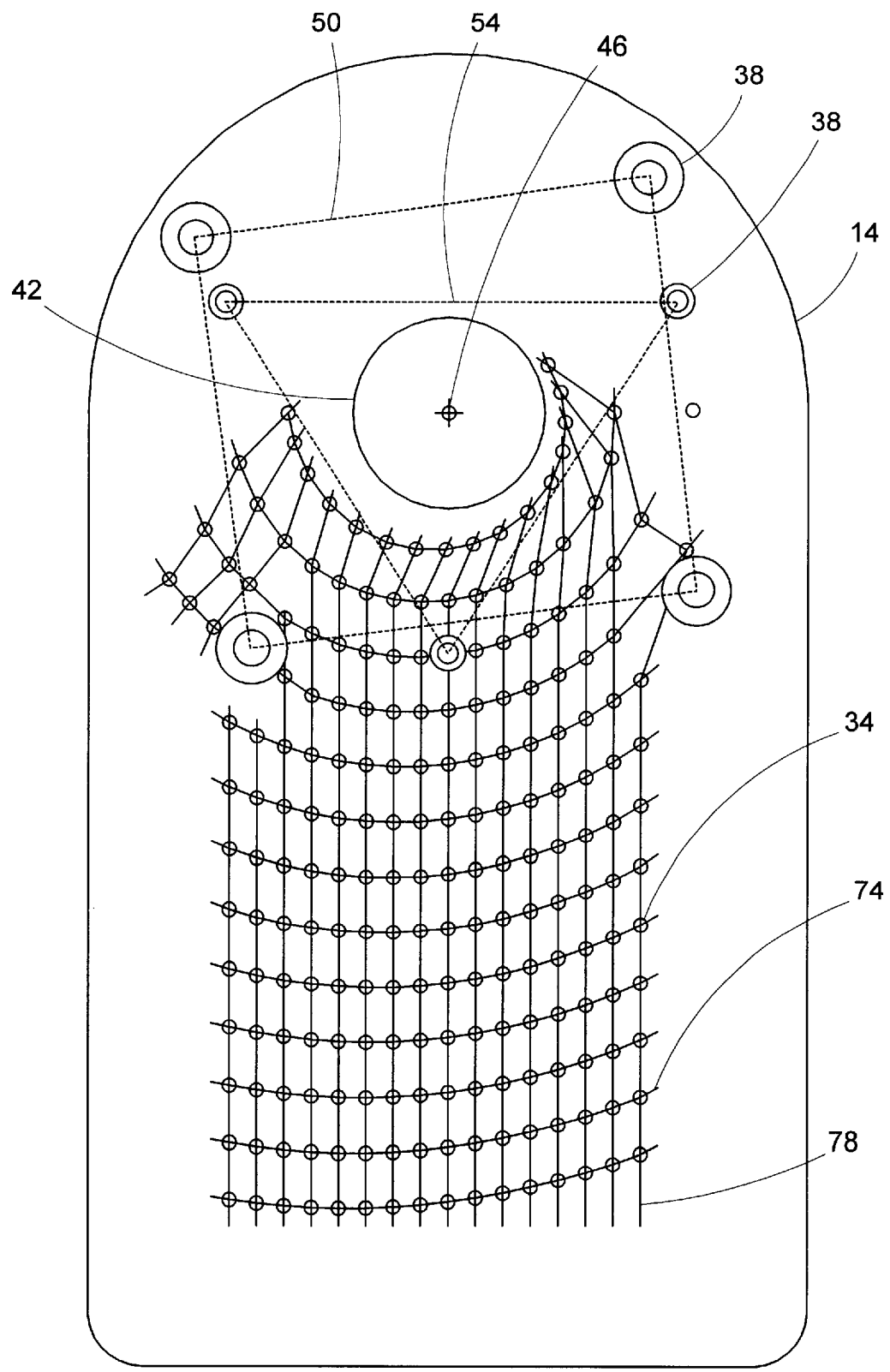
FIG. 2 is an illustrative specific embodiment of the circle jig shown in FIG. 1.

Referring to FIG. 2, one illustrative embodiment of the circle jig 14 is provided. The circle jig 14 may include a plate 33 having a plurality of pivot holes 34 positioned therein, a plurality of mounting holes 38, and an escape hole 42 that is illustrated having a reference point 46. Rather than holes that pass completely through the circle jig 14, it is contemplated that the pivot holes 34 may be comprised of a plurality of recesses, extending only partially through the circle jig 14.

As illustrated above, the mounting holes 38 may be used to attach the circle jig 14 to the base 26 of the router 10. It is contemplated that the circle jig 14 may have multiple sets of mounting holes 38 that are aligned on the circle jig 14 in various configurations to enable the circle jig 14 to be mounted to multiple routers 10 having different configurations of base holes 30. For example, a first set of mounting holes 50 (connected by dotted lines for illustration) may be aligned with the base holes 30 of a Porter Cable plunge router, model number 7539 (not shown). Alternatively, a second set of mounting holes 54 (connected by dotted lines for illustration) may be aligned with the base holes 30 of a Bosch plunge router, model number 1613 (not shown). Once the mounting holes 38 are aligned with the base holes 30 of the router 10, bolts, screws, clips, or any other fastening means may be used to attach the circle jig 14 to the base 26 of the router 10. Moreover, any number of mounting holes 38 may be positioned on the circle jig 14 in any configuration, which may enable the same circle jig 14 to be mounted to multiple routers 10. In one embodiment, the circle jig 14 may include mounting holes 38 that are configured for a variety of brand name routers 10, such as Porter Cable, DeWalt, Ryobi, Makita, Skill, etc.

The mounting holes 38 may be aligned on the circle jig 14 so that the bit 22 of the router 10 is aligned with a reference point 46. The escape hole 42 may provide an opening for waste material to escape when the bit 22 is engaged with a work piece (not shown). By allowing the waste material (e.g., sawdust, cuttings, etc.) to escape, the bit 22 may generate less heat when engaged with the work piece, and the wear on the bit 22 may be reduced. It is contemplated that the escape hole 42 may be comprised of a variety of shapes. In one embodiment, the escape hole 42 may have a spiral shape, illustrated below, to allow the waste material to escape even when larger bits 22 are attached to the router 10. Furthermore, as will be described below, by centering the bit 22 with the reference point 46, simple equations may be used along with the locations of the pivot holes 34 to precisely determine the diameter of circular cuts made with the router 10.

The circle jig 14 may be comprised of a variety of materials, such as wood, metal, plastic, or any other rigid material. In one embodiment, the circle jig 14 is comprised of cast acrylic having a thickness of approximately 5.6 mm. Moreover, the circle jig 14 may be comprised of a variety of shapes. For example, the circle jig may be circular, rectangular, square, or any other shape.

Figure 3:
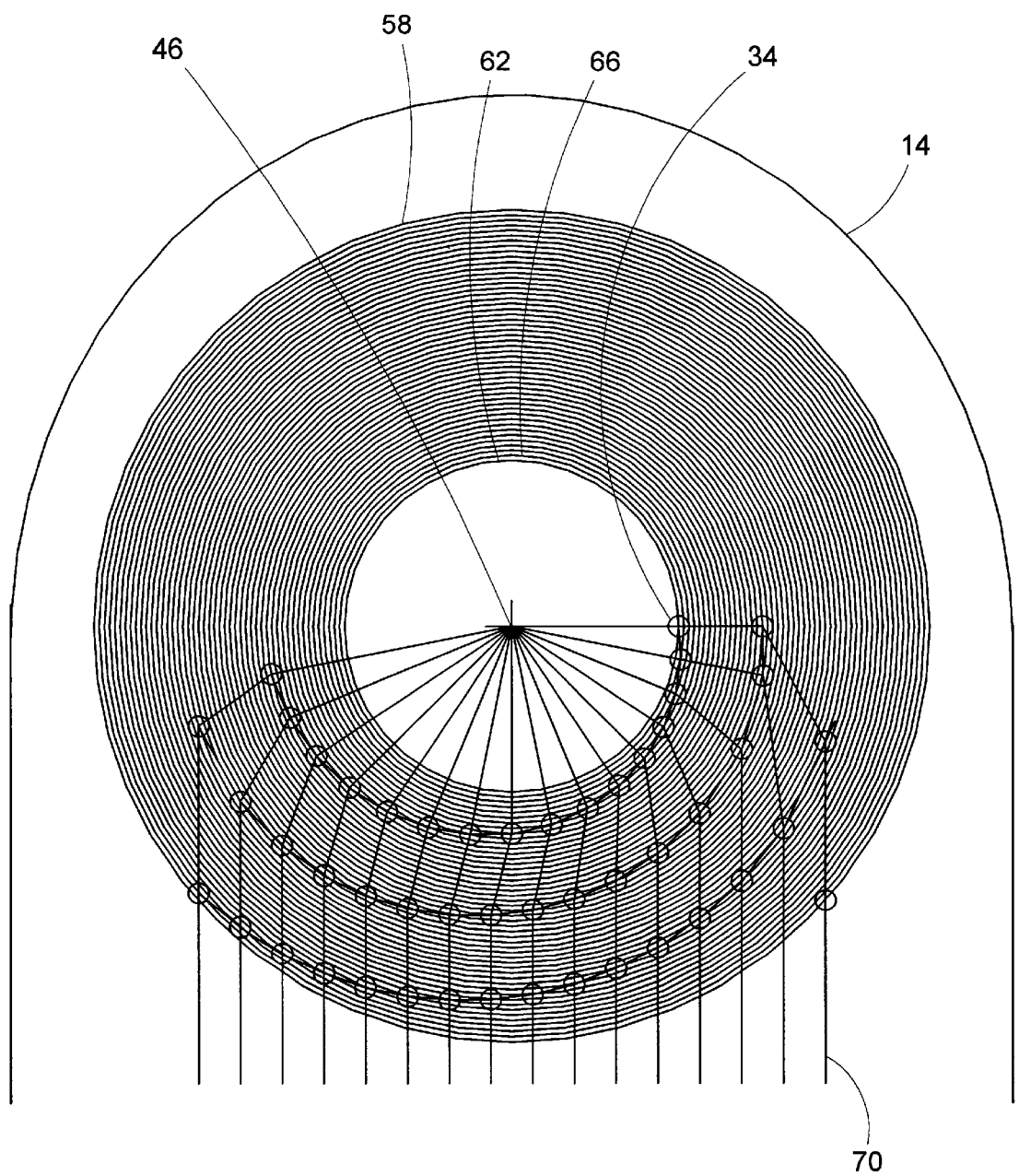
FIG. 3 is an expanded view of the circle jig shown in FIG. 2 having illustrative concentric circles positioned thereon.

To simplify locating a particular pivot hole 34, the pivot holes 34 may be positioned on the circle jig 14 in an array, and the method for determining the location of the pivot holes 34 may be understood with reference to FIG. 3. In FIG. 3, the circle jig 14 is designed by drawing a plurality of concentric circles 58 around the reference point 46. Each concentric circle 58 may have a diameter that is incrementally larger than the inwardly adjacent circle 58. For example, a first circle 62 may be drawn having a diameter of 2¼ inches, and a second circle 66 may be drawn having a diameter of 2 5/16 inches, which is 1/16 of an inch larger than the first circle 62. The diameter of the concentric circles 58 may be incrementally increased until the largest diameter that the circle jig 14 is designed to cut is reached. For example, in one embodiment, the circle jig 14 is drawn with a circle 58 having a diameter of 18 3/16 inches. As will be illustrated below, because the circle jig 14 is fixed and rotated about a single pivot hole 34, the location of the pivot holes 34 may determine the diameter of the circular cut. Furthermore, by decreasing the incremental distance between the concentric circles 58 and correspondingly increasing the number of pivot holes 34, the resolution of circular cuts that may be made with the circle jig 14 may be increased.

The pivot holes 34 may be located on the concentric circles 58 in a pattern that is convenient for locating any individual pivot hole 34. For example, the pivot holes 34 may be placed on grid lines 70 that represent fractional increments of the concentric circles 58. Moreover, if these lines 70 are located on a specific X coordinate location, the Y coordinate location for the pivot holes may be calculated by the equation:

$$Y=(R^2-X^2)^{1/2}$$

where R is the radius of the concentric circle 58, X and Y are coordinates of the pivot holes 34, and the reference point 46 is located at coordinate (0,0). It is contemplated that each concentric circle 58 may contain one pivot hole 34, and the resident pivot hole 34 for each concentric circle 58 may be positioned the same distance R away from the reference point 46 anywhere along the outer edge of the concentric circle 58.

Referring to FIG. 2, it is contemplated that a variety of organization schemes may be used to simplify locating a particular pivot hole 34. In one embodiment, the pivot holes 34 are organized in a two dimensional array delineated by main increment lines 74 and fractional increment lines 78, and the fractional increment lines 78 may correspond with the grid lines 70, shown in FIG. 3. Moreover, the main increment lines 74 and the fractional increment lines 78 may be calibrated, as described with the concentric circles 58, to represent precise distances away from the reference point 46. Furthermore, the main increment lines 74 and the fractional increment lines 78 may be calibrated using a variety of units, such as metric, American, etc. In one embodiment, the main increment lines 74 and the fractional increment lines 78 are calibrated in inches, and each pivot hole 34 represents the diameter of a precise circular cut that may be made, using the router 10.

Figure 4:
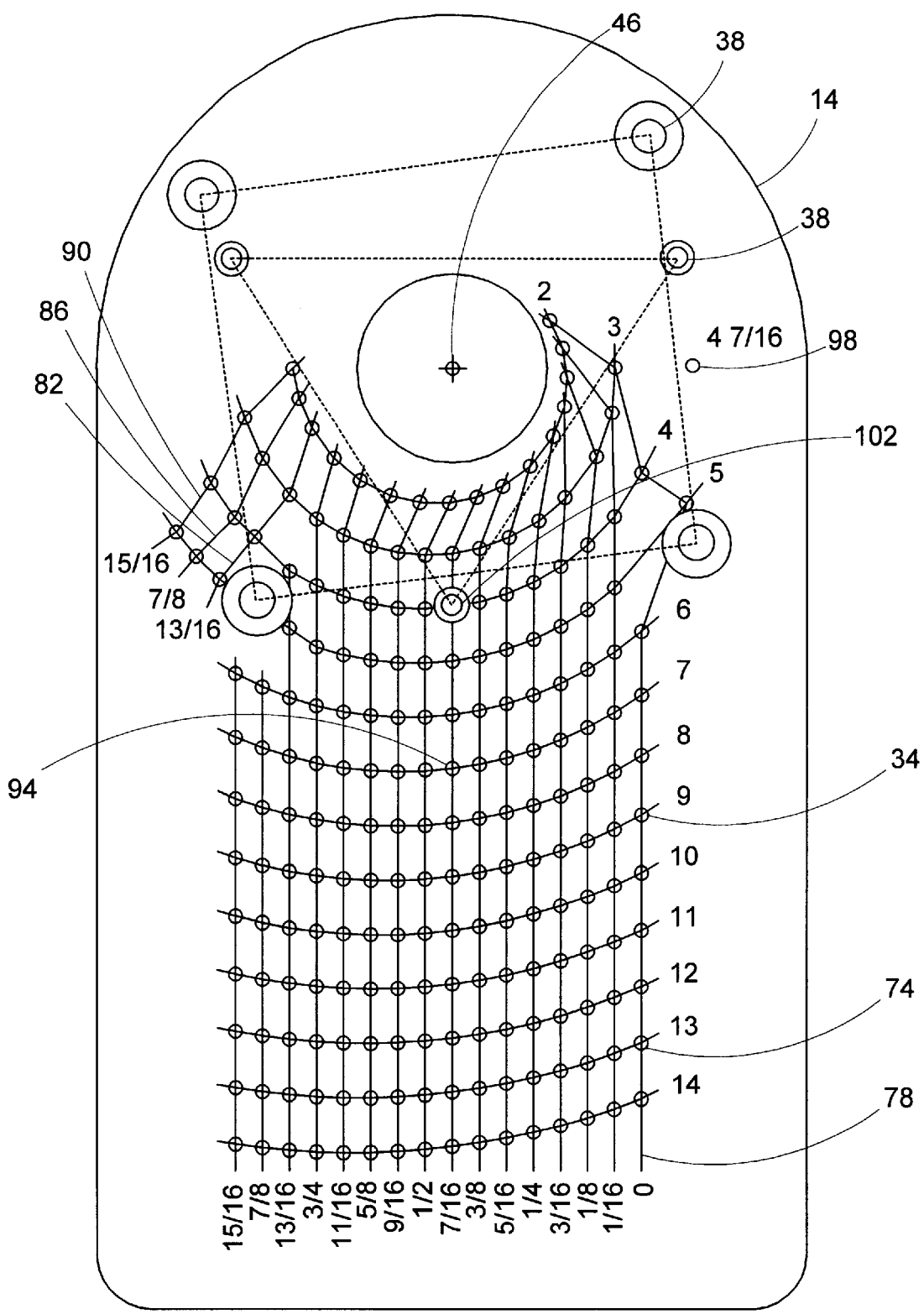
FIG. 4 is an illustrative specific embodiment of the circle jig shown in FIG. 2 having illustrative labeling positioned thereon.

Referring to FIG. 4, one illustrative calibration scheme of the fractional increment lines 78 and the main increment lines 74 is shown. The fractional increment lines 78 may be calibrated in increments of 1/16 of an inch with the right most fractional increment line 78 calibrated at 0 and the left most fractional increment line 78 calibrated at 15/16 of an inch. Because of space limitation, the fractional increment lines 82, 86, 90 may be calibrated at 13/16, 7/8, and 15/16 of an inch respectively. Furthermore, the main increment lines 74 may also be calibrated in inches, but in larger whole number increments. For example, the bottom most main increment line 74 may be calibrated at 14 inches with the next main increment line 74 calibrated at 13 inches, and so on. In this illustrative embodiment, the last main increment line 74 is calibrated at 2 inches. The calibration of the fractional increment lines 78 and the main increment lines 74 may be determined by the spacing of the concentric circles 58, shown in FIG. 3. As illustrated above, by incrementally increasing the diameter of the concentric circles 58 and skillfully determining the position of the pivot holes 34, the array of pivot holes 34, shown in FIG. 4, may be produced. For example, in this illustrative embodiment, the concentric circles 58, shown in FIG. 3, are incrementally increased in diameter by 1/16 of an inch, which produces the 1/16 inch calibration of the fractional increment lines 78, shown in FIG. 4. Furthermore, in this example, the concentric circles 58, of FIG. 3, begin with a diameter of 2 inches and are incrementally increased to 14 15/16 inches.

Using the calibration scheme described above, the diameter of a circular cut may easily be determined. For example, to find the pivot hole 34 that will produce a circular cut having a diameter of 7 7/16 inches, the pivot hole 34 that is located at the intersection of the main increment line 74 labeled with 7 and the fractional increment line 78 labeled with 7/16 may be selected. This is illustrated, in FIG. 4, at pivot hole 94. As will be described below, depending upon the position of the various pivot holes 34, the diameter of the bit 22 used with the router 10 may need to be considered when selecting the pivot hole 34 for a circular cut.

In one embodiment, the mounting holes 38 may interfere with the location of several pivot holes 34. When this occurs, the pivot holes 34 may be moved, along the appropriate concentric circle 58 to maintain the proper distance from the reference point 46, to a free location. This is illustrated, in FIG. 4, with pivot hole 98, which has been displaced by mounting hole 102. Because the pivot hole 98 is moved along its concentric circle 58, the pivot hole 98 is still positioned the same distance away from the reference point 46. Moreover, the distance of such pivot holes 98 may be individually labeled for convenience, as shown in FIG. 4.

Figure 5:
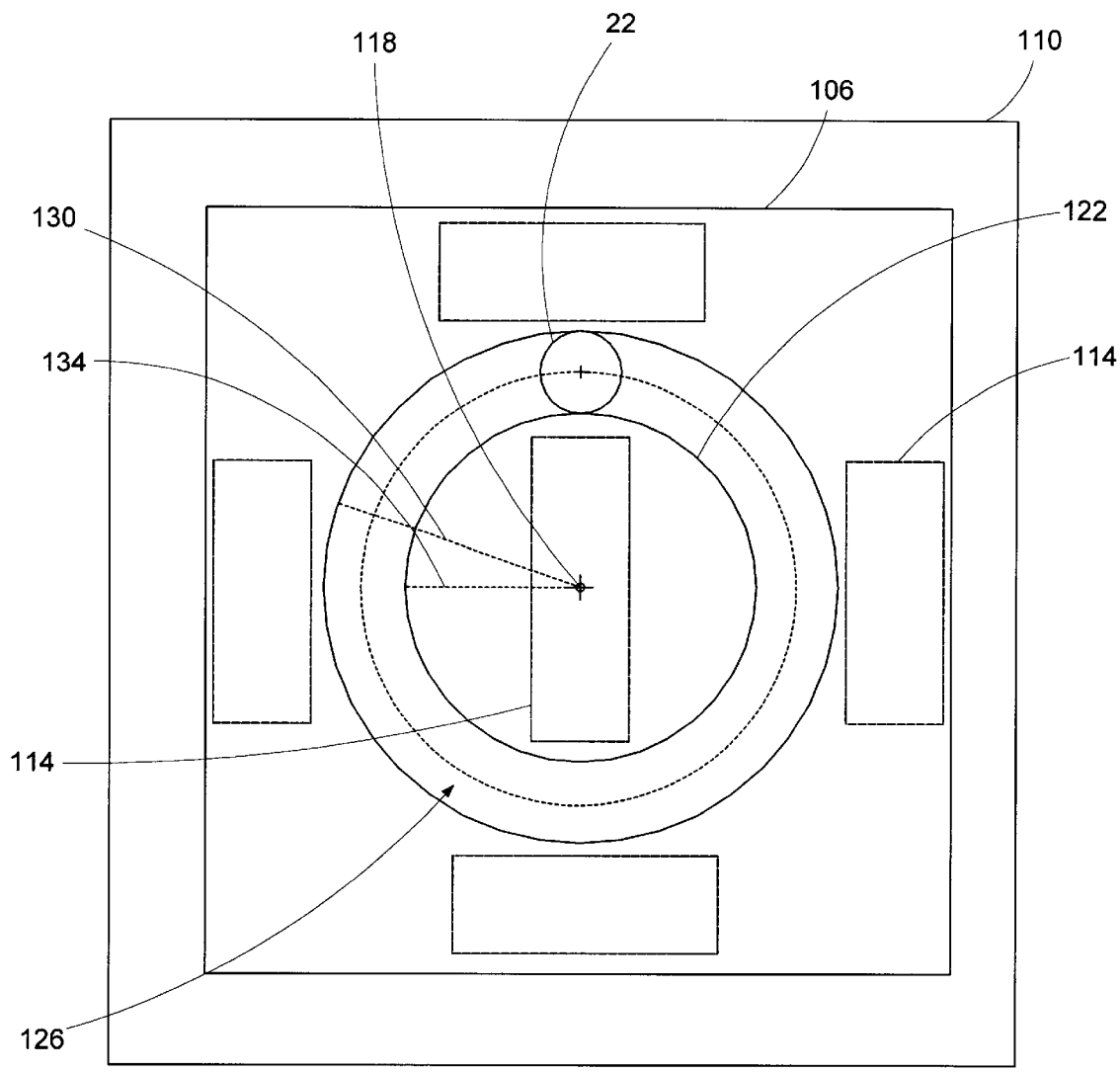
FIG. 5 is a top view of a work piece attached to a work surface.

The operation of the circle jig 14 may be understood with reference to FIG. 5. In FIG. 5, a work piece 106 may be secured to a work surface 110 using, for example, double-sided tape 114. In one embodiment, five pieces of double-sided tape 114 may be used to securely fix the work piece 106 to the work surface 110. Alternatively, it is contemplated that other means, such as clamps, screws, etc., may be used to hold the work piece 106 in position.

The work piece 106 may be comprised of a variety of materials, such as MDF, plywood, particleboard, solid wood, plastic sheets, or any other material suitable for being cut with a router 10. Once the work piece 106 is fastened to the work surface 110, a center hole 118 may be drilled into the work piece 106. The center hole 118 may establish the center of a circle 122 that is to be cut with the circle jig 14 and the router 10. A pivot pin (not shown) may be inserted into the center hole 118, and the pivot pin should extend above the surface of the work piece 106 approximately 0.2 inches. In one embodiment, it may be necessary to drill through the work piece 106 and into the work surface 110 to ensure the pivot pin does not extend more than 0.2 inches above the surface of the work piece 106. Depending upon the application, if the pivot pin extends beyond 0.2 inches above the work piece 106, it may interfere with the operation of the router 10.

Because the circle jig 14, must slide along the surface of the work piece 106 the circle jig 14 should be carefully installed on the router 10 to prevent damage, such as scratching, to the work piece 106. In FIG. 4, the mounting holes 38 are shown countersunk to reduce the likelihood that the mounting screws (not shown) will damage the work piece 106. In this embodiment, the circle jig 14 is installed on the base 26 of the router 10 with the top surface (i.e., the surface shown in FIG. 4) of the circle jig 14 facing down.

Because the circle jig 14 is installed with the top surface facing down, the base 26 or supporting frame 18 of the router 10 may not interfere with locating a particular pivot hole 34 with the labeling of the fractional increment lines 78 or the main increment lines 74. Furthermore, the labeling of the main increment lines 74 and the fractional increment lines 78 may be silk screened on a top surface of the circle jig 14. In one embodiment, the circle jig 14 may be made of a clear material, and the labeling may be viewed from both the top surface and the bottom surface of the circle jig 14. Alternatively, the labeling of the main increment lines 74 and the fractional increment lines 78 may be silk screened on both the top surface and the bottom surface of the circle jig 14. Although the circle jig 14 is described with the top surface facing down when mounted to the router 10, it is contemplated that, with other embodiments, the circle jig 14 may be designed such that the top surface faces up, when mounted to the router 10. Moreover, the particular alignment of the circle jig 14 may be varied as a matter of design choice.

Once the circle jig 14 is attached to the router 10, the appropriate pivot hole 34 for making the circular cut may be selected. Moreover, as will be illustrated below, the appropriate pivot hole 34 may vary depending upon the application. In FIG. 5, the circle jig 14 may be used to cut a circular mortise 126 in the work piece 106. The mortise 126 includes a major mortise diameter 130 (illustrated with a dotted line) and a minor mortise diameter 134 (illustrated with a dotted line.) The difference between the major and minor mortise diameters 130, 134 may be determined by the diameter of the bit 22. The appropriate pivot hole 34 may be determined from the desired major and minor mortise diameters 130, 134 and the diameter of the bit 22. In one embodiment, the labeling of the pivot holes 34 does not account for the diameter of the bit 22. To adjust for the diameter of the bit 22 and select the appropriate pivot hole 34 for a desired major mortise diameter 130, the following equation may be used:

$$\text{Pivot hole}=\text{major mortise diameter}-\text{bit diameter.}$$

The dimension obtained from the calculation may be used to select the appropriate pivot hole 34 using the main increment lines 74 and the fractional increment lines 78, shown in FIG. 4. To adjust for the diameter of the bit 22 and select the appropriate pivot hole 34 for a desired minor mortise diameter 134, the following equation may be used:

$$\text{Pivot hole}=\text{minor mortise diameter}+\text{bit diameter.}$$

As shown in FIG. 5, the difference between the major mortise diameter 130 and the minor mortise diameter 134 (i.e., the width of the mortise 126) may be determined by the diameter of the bit 22. Once the desired bit 22 is selected and the appropriate pivot hole 34 is determined, the pivot pin may be inserted into the circle jig 14 through the appropriate pivot hole 34. It is contemplated that the pivot pin may be comprised of a variety of devices. For example, the pivot pin may be a nail, screw, pin, clip, or any other appropriate device. In one embodiment, the pivot pin is a metallic cylindrical pin having a diameter that is slightly larger than the diameter of the pivot holes 34. Because the diameter of the pivot pin is larger than the diameter of the pivot holes 34, the pivot pin may be frictionally fit into the pivot holes 34, while still being removable from the pivot holes 34.

Next, the free end of the pivot pin may be inserted into the center hole 118 with the opposite end of the pivot pin still positioned in the selected pivot hole 34. In this position, the circle jig 14 may be substantially parallel with the work piece 106. Moreover, by applying a downward force to the router 10, the bit 22 of the router 10 may be engaged through the escape hole 42 with the work piece 106. Once engaged, the router 10 may be rotated about the pivot pin and center hole 118, producing the mortise 126 shown in FIG. 5. It is contemplated that the mortise 126 may be made in stages where the plunge depth is made deeper in each successive stage. Those skilled in the art will appreciate that, by using the above equations and varying the diameter of the bit 22, the major mortise diameter 130, the minor mortise diameter 134, and the width of the mortise 126 may be precisely determined with the circle jig 14.

It is contemplated that the same procedure described above may be followed to make circular cutouts. The equation used for making circular cutouts varies depending upon the material of interest in the work piece 106. If the diameter of the hole to be cut in the work piece 106 is of interest, then the equation for the major mortise diameter 130 may be used. For example, this may be the case when cutting holes in a speaker box (not shown). In this case, the diameter of the hole is of interest, and the diameter of the hole is determined by the major mortise diameter 130. If the diameter of the circular piece is of interest, then the equation for the minor mortise diameter 134 is used. For example, this may be the case when cutting circular tabletops (not shown). In this case, the diameter of the circular piece is of interest, and the diameter of the circular piece is determined by the minor mortise diameter 134.

In the examples described above, the calibration and labeling of the pivot holes 34 is from the reference point 46, shown in FIG. 4. Because the reference point 46 does not account for the diameter of the bit 22, the simple calculations, described above, may be used to determine the location of the appropriate pivot hole 34, for making circular cuts. Alternatively, it is contemplated that the location of the pivot holes 34 may be calibrated and positioned on the circle jig 14 to account for the diameter of a particular bit 22. In this example, the location of the reference point 46 may be adjusted to account for the diameter of the bit 22. Furthermore, using the designed for bit 22, the labeling of the main increment axis 74 and the fractional increment axis 78, shown in FIG. 4, may correspond with the adjusted position of the reference point 42, and the diameter of circular cuts made with the calibrated pivot holes 34. Those skilled in the art will appreciate that, by calibrating the pivot holes 34 of the circle jig 14 for a particular bit 22, other calculations may be required when making mortise cuts, cutting circular pieces, and when other bits 22 are used in the router 10. Moreover, depending upon the application, the pivot holes 34 may be calibrated and positioned on the circle jig 14, using the methods described above, with respect to the reference point 46, a particular bit 22, or any other design consideration.

Figure 6:
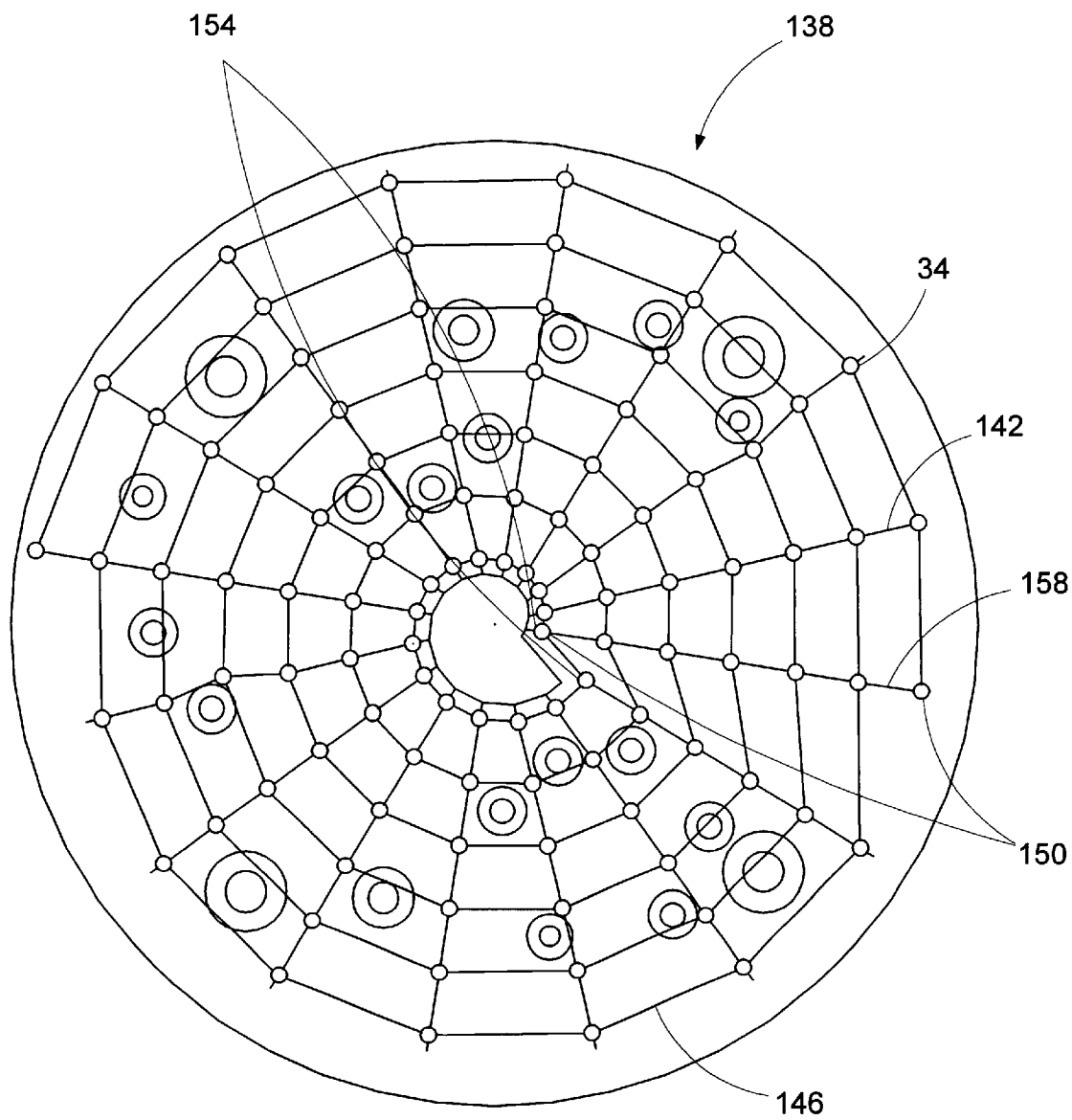
FIG. 6 is an illustrative specific embodiment of the circle jig shown in FIG. 1.

Referring to FIG. 6, another embodiment of a circle jig 138 is shown in accordance with the present invention. In this embodiment, the pivot holes 34 are organized on a grid of radial lines 142 and circular lines 146. The radial lines 142 extend away from the center of the circle jig 138 and pass through a first set of pivot holes 150. The radial lines 142 are intersected by the circular lines 146, and the circular lines 146 pass through a second set of pivot holes 154 that orbit the center of the circle jig 138. The pivot holes 34 may be located at the intersections of the radial lines 142 and the circular lines 146.

The first set 150 of pivot holes 34 may be located in whole number increments away from the center of the circle jig 138, while the second set 154 of pivot holes 34 may be located in additional fractional increments away from the center of the circle jig 138. For example, each radial line 142 may represent an incremental fractional difference in distance away from the center of the circle jig 138, while each circular line 146 may represent an incremental whole number difference in distance away from the center of the circle jig 138. Furthermore, if the radial lines 142 are located at fixed angles, the equations for calculating the X,Y coordinates of the pivot holes 34 are as follows:

$$Xo=n*\cos(a+N*da)$$

$$Yo=n*\sin(a+N*da)$$

where n is the radius of the circle to be cut, calibrated for a particular bit 22 diameter, a is the offset angle for the first radial line 158 (i.e., line 0), da is the angle between the radial lines 142, N is the number of fractional increments, Xo is the X coordinate of the pivot hole 34, and Yo is the Y coordinate of the pivot hole 34.

Figure 7:
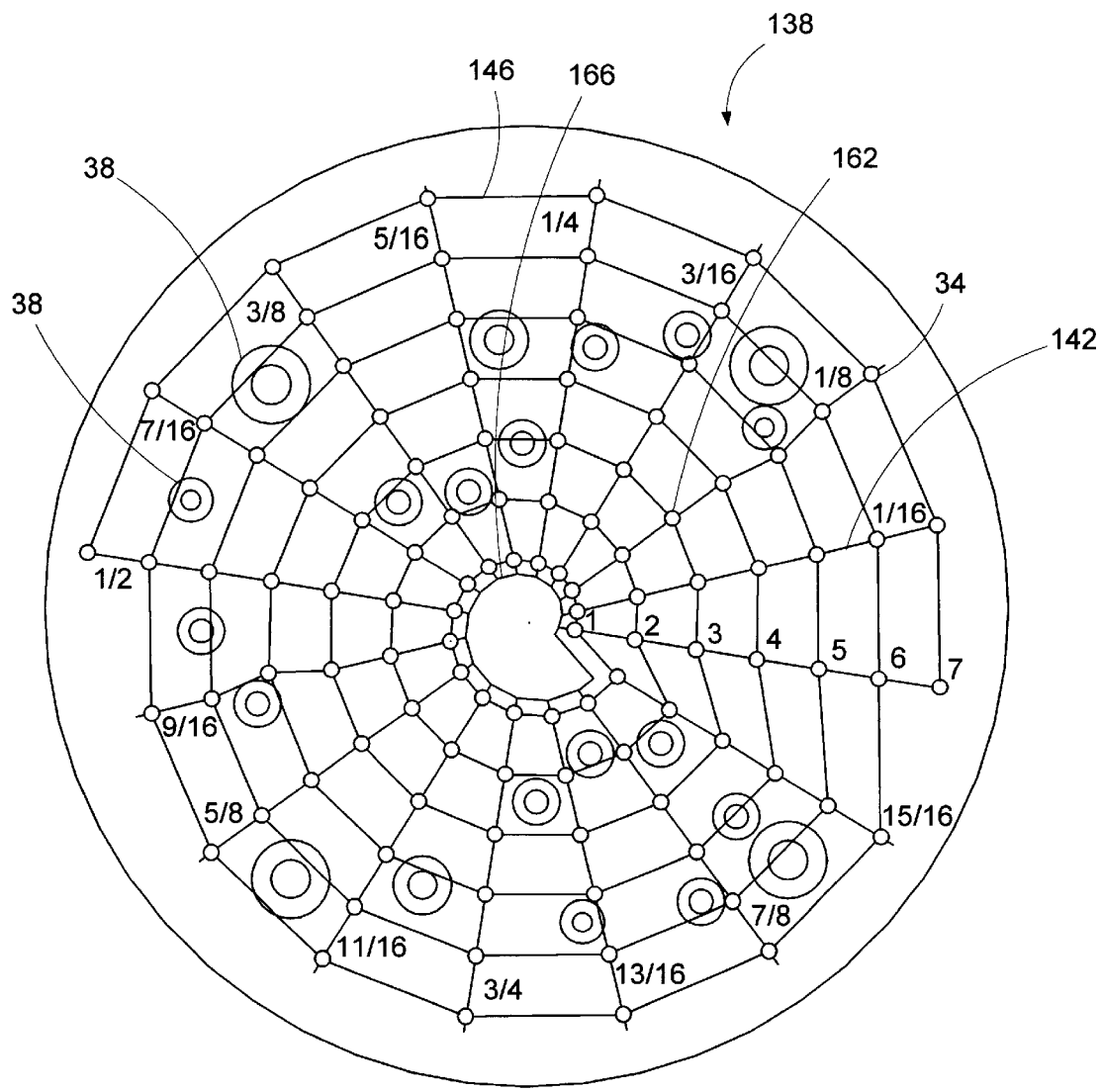
FIG. 7 is an illustrative specific embodiment of the circle jig shown in FIG. 6 having illustrative labeling positioned thereon.

Referring to FIG. 7, the radial lines 142 and the circular lines 146 are labeled with exemplary values. Those skilled in the art will appreciate that the pivot holes 34 may be positioned in a variety of configurations and that the resolution of the circle jig 138 may be increased by increasing the number of radial lines 142, circular lines 146, and correspondingly increasing the number of pivot holes 34. Furthermore, the positions of the pivot holes 34 may be calibrated in a variety of units, and the particular unit selected may vary, depending upon the application. In FIG. 7, the radial lines 142 and the circular lines 146 are calibrated in inches. Moreover, each radial line 142 represents $\frac{1}{16}$ of an inch increase in incremental distance from the center of the circle jig 138, and each circular line 146 represents a 1 inch increase in distance from the center of the circle jig 138.

In this illustrative embodiment, the circle jig 138 has a hole cutting resolution between 1 and 7½ inches. The circle jig 138 may be used to cut, among other things, mortises, circular pieces, and circular holes. In one embodiment, the pivot holes 34 may be calibrated and positioned on the circle jig 138 to account for the diameter of a particular bit 22. In this example, labels of the pivot holes 34 may correspond with the diameter of the holes to be cut. For example, to cut a hole having a diameter of 3⅛ inches, the pivot pin may be inserted through pivot hole 162, shown in FIG. 7. As described above, the pivot pin may be inserted through the pivot hole 162 and into the center hole 118 of the work piece 106. Next, the circle jig 138 and the router 10 may be rotated about the pivot pin and the center hole 118, and a hole having a diameter of 3⅛ inches may be produced. Alternatively, as described above simple equations may be used along with the precise locations of the pivot holes 34 to account for the varying diameters of different bits 22.

The escape hole 166, shown in FIG. 7, has a spiral shape to accommodate larger bits 22 while still allowing waste material to escape. Furthermore, the circle jig 138 may include mounting holes 38 positioned in various locations to accommodate mounting the circle jig 138 to multiple routers 10.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A circle jig, comprising:
    a plate having an escape hole and a plurality of pivot holes formed therein, the plate having a reference point, the pivot holes being positioned on an outer edge of a plurality of concentric circles, and wherein
    the pivot holes are positioned in the plate at the intersection of a plurality of main increment lines and a plurality of fractional increment lines.

2. The circle jig of claim 1, further comprising the plate having a plurality of mounting holes formed therein.

3. The circle jig of claim 2, wherein the plurality of mounting holes are arranged on the plate in a plurality of groups, and the plurality of mounting hole groups substantially align with base hole configurations of a plurality of routers.

4. The circle jig of claim 3, wherein the arrangement of the mounting hole groups substantially aligns a bit from the plurality of routers with the reference point of the plate.

5. The circle jig of claim 2, wherein the plurality of mounting holes are positioned at least a first distance from the reference point, and at least a first group of pivot holes are positioned a second distance from the reference point, the second distance being less than the first distance.

6. The circle jig of claim 2, wherein at least one mounting hole interferes with the location of at least one pivot hole positioned a first distance from the reference point, and the pivot hole is rotated along a circular path to a free location on the plate, and the free location is positioned a second distance from the reference point, the second distance being substantially equal to the first distance.

7. The circle jig of claim 1, wherein the pivot holes are positioned in a nonlinear array.

8. The circle jig of claim 1, wherein the pivot holes are arranged on the outer edge of the concentric circles to prevent adjacent pivot holes from interfering with each other.

9. The circle jig of claim 1, wherein the concentric circles are spaced apart by an incremental distance, and the incremental distance determines an incremental resolution of the circle jig.

10. The circle jig of claim 9, wherein the incremental resolution of the circle jig is increased by decreasing the incremental distance between the concentric circles.

11. A method for constructing a circle jig, comprising:
    determining a reference point on a plate;
    positioning a plurality of pivot holes in the plate, the pivot holes being positioned in a nonlinear array; and
    connecting the pivot holes with a plurality of main increment lines and a plurality of fractional increment lines that delineate the position of the pivot holes with respect to the reference point.

12. The circle jig of claim 1, wherein the plate is comprised of a clear plastic material and the main increment lines and the fractional increment lines are viewable from both a top surface and a bottom surface of the plate.

13. The circle jig of claim 1, wherein the intersection of the main increment lines and the fractional increment lines delineates a distance the pivot holes are located from the reference point.

14. The circle jig of claim 13, wherein the main increment lines delineate a first distance and the fractional increment lines delineate a second distance, and the distance the pivot holes are positioned from the reference point is substantially equal to the sum of the first and second distances.

15. The circle jig of claim 14, wherein the first distance is marked along a first side of the plate and the second distance is marked along a second side of the plate.

16. The circle jig of claim 14, wherein the pivot holes intersected by the same main increment line are positioned from the reference point by the same first distance, and the pivot holes intersected by the same fractional increment line are positioned from the reference point by the same second distance.

17. The circle jig of claim 1, wherein the reference point delineates the center of the escape hole.

18. The circle jig of claim 1, wherein the reference point is calibrated for a router bit having a predetermined diameter.

19. The circle jig of claim 1, wherein the pivot holes are adapted to receive a removable pivot pin.

20. A method for using a circle jig, comprising:
    attaching the circle jig to a base of a router;
    determining the diameter of a circular cut;
    selecting a pivot hole at an intersection of a main increment line and a fractional increment line, the main increment line delineating a first distance, and the fractional increment line delineating a second distance, and distance the pivot hole is positioned from the reference point is substantially equal to the sum of the first and second distances;
    securing the pivot hole about a pivot point in a work piece; and
    rotating the circle jig and the router in a circular motion around the pivot point.

21. The method of claim 20, wherein the router is comprised of a plurality of base holes and the circle jig is comprised of a plurality of mounting holes that are arranged in a plurality of configurations for multiple routers and attaching the circle jig to the base of the router comprises aligning a group of mounting holes with the base holes.

22. The method of claim 20, further comprising securing the work piece to a work surface using double sided tape.

23. The method of claim 20, wherein the router comprises a bit that has a first diameter and selecting the pivot hole on the circular jig that corresponds with the diameter of the circular cut comprises subtracting the first diameter from the diameter of the circular cut.

24. The method of claim 20, wherein the router comprises a bit that has a first diameter and selecting the pivot hole on the circular jig that corresponds with the diameter of the circular cut comprises adding the first diameter to the diameter of the circular cut.

25. The method of claim 11, further comprising positioning an escape hole in the plate.

26. The method of claim 25, wherein securing the pivot hole about the pivot point comprises inserting a first end of a pivot pin into the pivot hole and inserting a second end of the pivot pin into a center hole in the work piece.

27. The method of claim 26, wherein the circle jig is comprised of a plurality of mounting holes that are positioned a first distance from the reference point, and a first group of pivot holes that are positioned a second distance from the reference point, the second distance being less than the first distance, and securing the pivot hole about the pivot point comprises inserting the pivot pin in at least one of the first group of pivot holes.

28. The method of claim 11, wherein positioning the plurality of pivot holes in the plate comprises calibrating the position of the reference point to adjust for a diameter of a router bit.

29. The method of claim 11, further comprising positioning a plurality of mounting holes in the plate.

30. The method of claim 29, wherein positioning the mounting holes in the plate comprises arranging the mounting holes to substantially align with base hole configurations of a plurality of routers.

31. The method of claim 30, wherein positioning the mounting holes in the plate comprises arranging the mounting holes in the plate to substantially align a bit from the plurality of routers with the reference point of the plate.

32. The method of claim 29, wherein the mounting holes are positioned a first distance from the reference point and positioning the plurality of pivot holes in the plate comprises positioning a first group of pivot holes a second distance from the reference point, the second distance being less than the first distance.

33. The method of claim 11, wherein positioning a plurality of pivot holes in the plate comprises drawing a plurality concentric circles on the plate and positioning the pivot holes on an outer edge of the concentric circle.

34. The method of claim 33, wherein positioning the plurality of pivot holes in the nonlinear array comprises arranging the pivot holes on the outer edge of the concentric circles to prevent adjacent pivot holes from interfering with each other.

35. The method of claim 33, wherein drawing the plurality of concentric circles comprises increasing the diameters of the concentric circles by an incremental distance, and the incremental increase in the diameters of the concentric circles determines an incremental resolution of the circle jig.

36. The method of claim 35, wherein decreasing the incremental distance of the diameters of the concentric circles increases the incremental resolution of the circle jig.

37. The method of claim 11, wherein the main increment lines delineate a first distance, and the fractional increment lines delineate a second distance, and the distance the pivot holes are positioned from the reference point is substantially equal to the sum of the first and second distances.

* * * * *